United States Patent [19]

Lestournel et al.

[11] Patent Number: 5,141,378
[45] Date of Patent: Aug. 25, 1992

[54] MOBILE INTERVENTION CHAMBER PROVIDING ACCESS TO AN INSTALLATION PLACED IN AN ACTIVE CELL

[75] Inventors: Eric Lestournel, Martinvast; Patrice Beaumont, Querqueville; Armand Lecourtois, Equeurdreville, all of France

[73] Assignee: Cogema-Compagnie Generale Des Matieres Nucleaires, Velizy Villacoublay, France

[21] Appl. No.: 661,106

[22] Filed: Feb. 26, 1991

[30] Foreign Application Priority Data

Feb. 28, 1990 [FR] France .................. 90 02501

[51] Int. Cl.⁵ .................................. B25J 3/00
[52] U.S. Cl. ........................... 414/8; 165/11.2; 376/260; 414/909
[58] Field of Search .............. 414/8, 1, 735, 909; 165/11.2; 376/260

[56] References Cited

U.S. PATENT DOCUMENTS

| 2,822,094 | 2/1958 | Greer | 414/8 X |
|---|---|---|---|
| 4,523,884 | 6/1985 | Clement et al. | 414/8 |
| 4,687,400 | 8/1987 | Lichti . | |

FOREIGN PATENT DOCUMENTS

| 0050561 | 4/1982 | European Pat. Off. . | |
|---|---|---|---|
| 0123598 | 10/1984 | European Pat. Off. . | |
| 1345248 | 10/1963 | France | 414/1 |
| 2074780 | 8/1971 | France . | |
| 1058140 | 2/1967 | United Kingdom | 414/1 |

Primary Examiner—Robert J. Spar
Assistant Examiner—Donald W. Underwood
Attorney, Agent, or Firm—Pearne, Gordon, McCoy & Granger

[57] ABSTRACT

So as to be able to carry out various operations, especially for cleaning observation and simple interventions, on an installation placed in an active cell, the present invention provides a mobile intervention chamber including a caisson (40) adapted to be docked on an access orifice formed in an upper horizontal partition of the cell. The caisson (40) contains the modular elements (88) of an intervention pole (94), these elements being placed on a tool holder barrel (78). With the aid of auxiliary handling arms and a retractable support (110), a pole (94) of a suitable type and length is long-distance constructed on a mechanism (128) mounted on a rotary plate (120) integrated in the ceiling of the caisson (40). Shielding windows (232, 236) and lighting and display systems facilitate the carrying out of intervention operations.

11 Claims, 7 Drawing Sheets

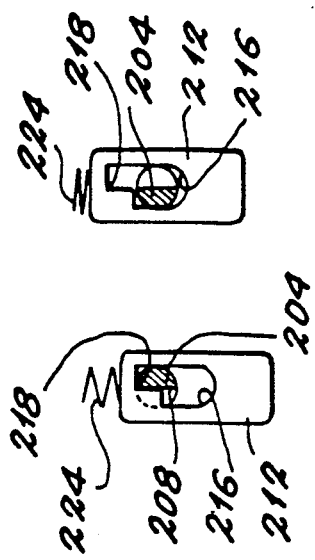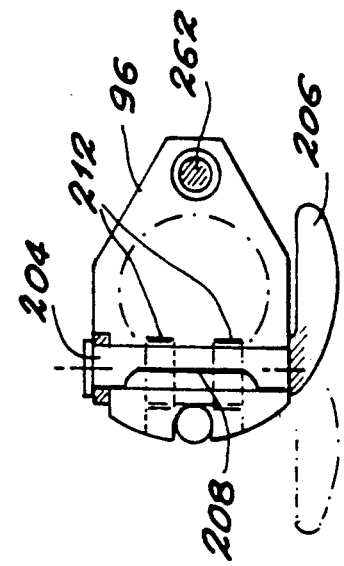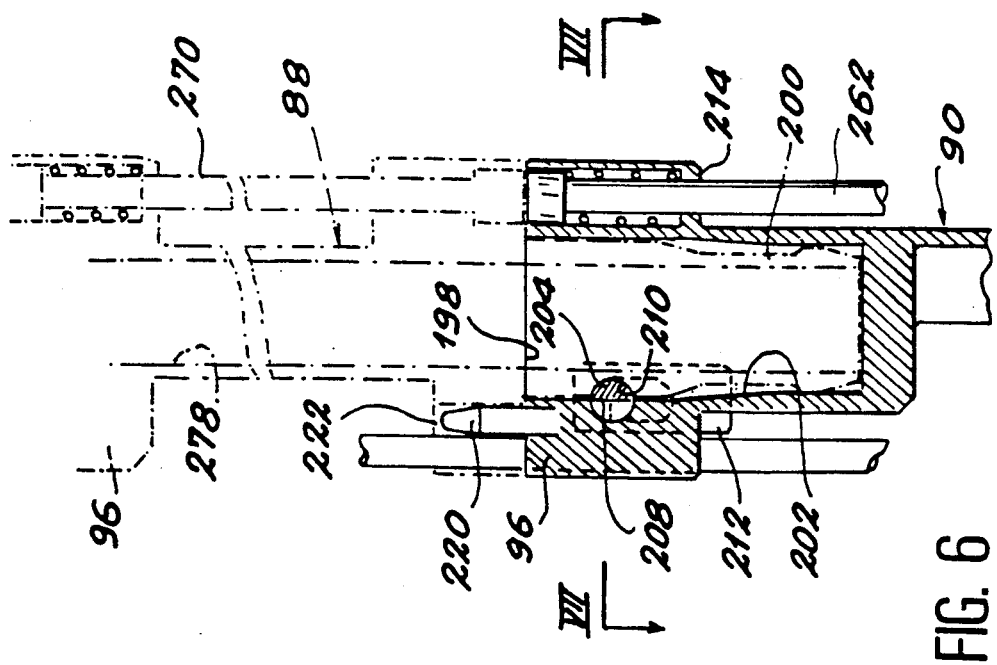

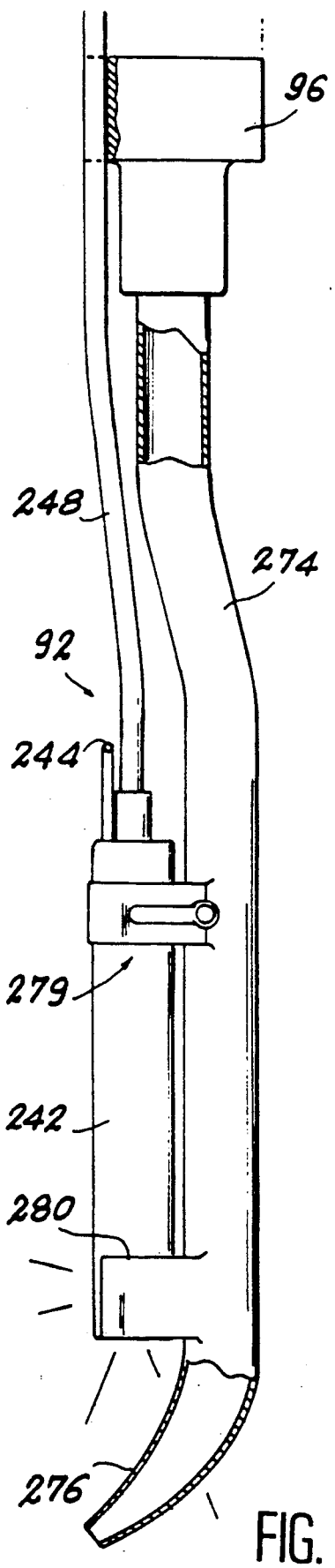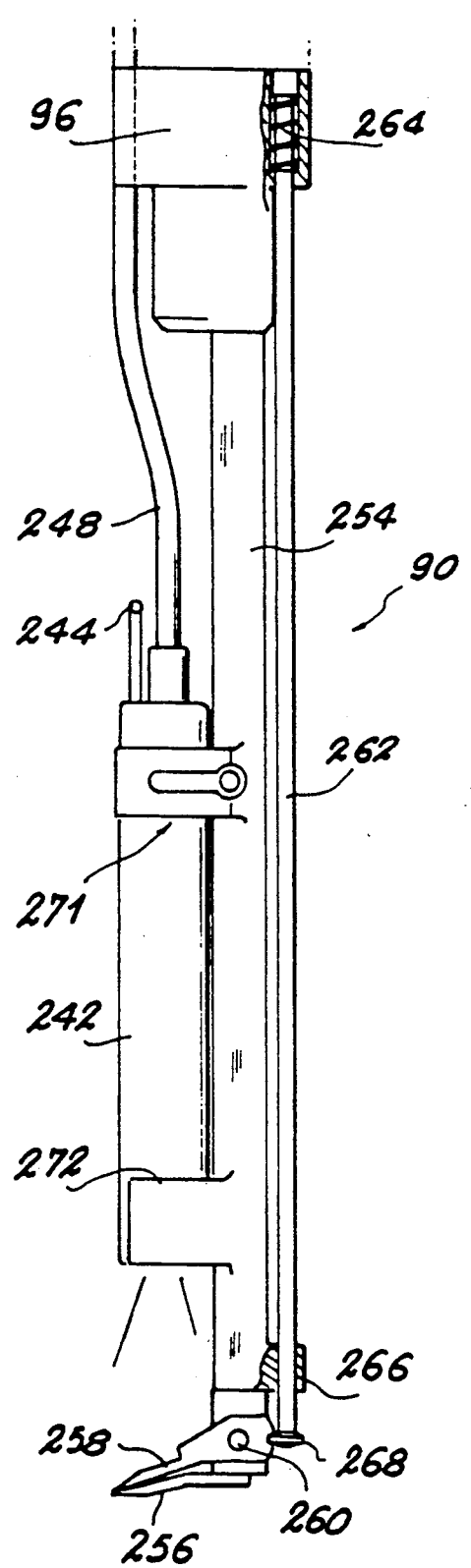
FIG. 10
FIG. 9

MOBILE INTERVENTION CHAMBER PROVIDING ACCESS TO AN INSTALLATION PLACED IN AN ACTIVE CELL

FIELD OF THE INVENTION

The invention concerns a mobile intervention chamber designed in such a way as to be able to carry out various tasks, such as the inspection, cleaning or intervention on certain devices placed inside an active cell in a nuclear installation, such as an installation for the reprocessing of fuel elements previously irradiated in nuclear reactors.

BACKGROUND OF THE INVENTION

The document FR-A-83 06028 describes a mobile barrel equipment removal chamber (M.B.E.R.C.) making it possible to replace certain parts of devices place inside an active cell and forward these contaminated parts to a suitable storage place. This chamber includes a barrel system whose cells make it possible to receive the mobile sub-assembly, normally blocking off access to the device in question, the contaminated part, a new part and, possibly, an intervention tool.

It can be readily understood that such a M.B.E.R.C. chamber only allows very specific interventions, even when a cell is provided to house an intervention tool. In particular, this chamber does not make it possible to observed the condition of an item of equipment and then carry out any operation required by the condition of this item.

SUMMARY OF THE INVENTION

The object of the invention is to provide a different type of a complementary mobile intervention chamber designed in such a way as to enable operators to examine the various sections of devices placed in the active cell and intervene on these devices, especially for cleaning them, this cleaning then being adapted to the nature of any possible waste to be removed and to the location of this waste, or simple interventions, such as the laying or depositing of parts of orifice block ups.

According to the invention, this result is obtained by using a mobile intervention chamber able to be docked on an access orifice formed in one upper wall of an installation so as to intervene of the latter, wherein this chamber includes:

a sealed caisson provided with one lateral wall; a floor pierced with one circular access opening, normally blocked off by a door; and one floor comprising a rotating plate with an axis offset and parallel with respect to the axis of the access opening;

a tool holder barrel housed in the caisson and able to rotate around an axis offset and parallel with respect to the axes of the rotary plate and the access opening, this barrel comprising receptacles on its periphery;

modular elements including at least one extension piece and at least one tool able to be individually received in said receptacles and be assembled end-to-end so as to form an intervention pole;

a retractable support housed in the caisson and able to occupy one fully retracted position uncoupled from the access opening and one active position situated along the axis of the latter so as to be able to temporarily support the modular elements;

a mechanism for supporting and controlling the intervention pole and implanted on the rotary plate at a location suitable for being placed at will along the axis of the access opening and along the axis of a holding station on which each receptacle of the barrel is able to be brought, this mechanism allowing for translation movements of the pole along its axis, for rotating around its axis, for pivoting around said location and for actuating the tool; and means to control from outside the caisson the rotations of the rotary plate, the tool holder barrel and the retractable support.

With a chamber of this type one or several operators, situated outside and being able to view both the inside of the chamber through shielding widows provided in the wall of the caisson and in the proximity of the device on which interventions may be required using a camera borne by the tool, are able to carry out inspection tasks, possible completed by an endoscopic examination of the orifice outlet, cleaning tasks, such as the gripping, sucking up and removal of debris and the high-pressure cleaning of certain zones, such as the bearing surfaces of joints, as well as intervention tasks, such as the laying of parts or orifice lockout.

Furthermore, the modular nature of the intervention pole makes it possible to adapt its length for each task.

To this effect, a locking device is provided on each modular element, said device being able to occupy one locked position for linking with a neighbouring modular element and one unlocked mounting and dismounting position. Accompanying handling means are also provided, these means being controlled from outside the caisson and placed inside the latter so as to switch the locking means between their locked and unlocked positions.

So as to avoid any accidental unlocking of the link between the modular elements, each locking device is preferably blocked by a blocking device when the corresponding module is suspended, this blocking device only freeing the corresponding locking device when the module is placed.

So as to allow for actuation of the locking device, the accompanying handling means preferably include at least one auxiliary handling arm traversing the lateral wall of the caisson and at least one annexed pair of pliers mounted on this arm and able to be laid on a pliers holder rack placed in the caisson.

So as to facilitate the removal of waste, a receptacle, on which a waste bin is able to be placed, is provided on the floor of the caisson at a location able to be aligned with the intervention pole when rotating the rotary plate. This waste bin may be introduced and removed by a passage normally closed by a door, this passage being formed in the caisson close to the receptacle of the waste bin.

BRIEF DESCRIPTION OF THE DRAWINGS

There now follows one preferred embodiment of the invention, this embodiment being given by way of non-restrictive example with reference to the accompanying drawings in which:

FIG. 6 is a longitudinal cutaway view representing on larger scale the link between two modular elements of the intervention pole;

FIG. 7 is a cutaway view along the line VIII—VIII of FIG. 6;

FIGS. 8a and 8b are detailed views respectively representing in a blocking position and a free position the blocking device preventing the accidental opening of the locking means illustrated on FIGS. 6 and 7;

FIG. 9 represents a pair of gripping pliers provided to equip the intervention pole, and FIG. 10 represents a partial longitudinal section of a suction extension piece provided in order to be fixed at the extremity of the intervention pole.

DETAILED DESCRIPTION OF THE PREFERRED EMBODIMENTS

Figure 1:
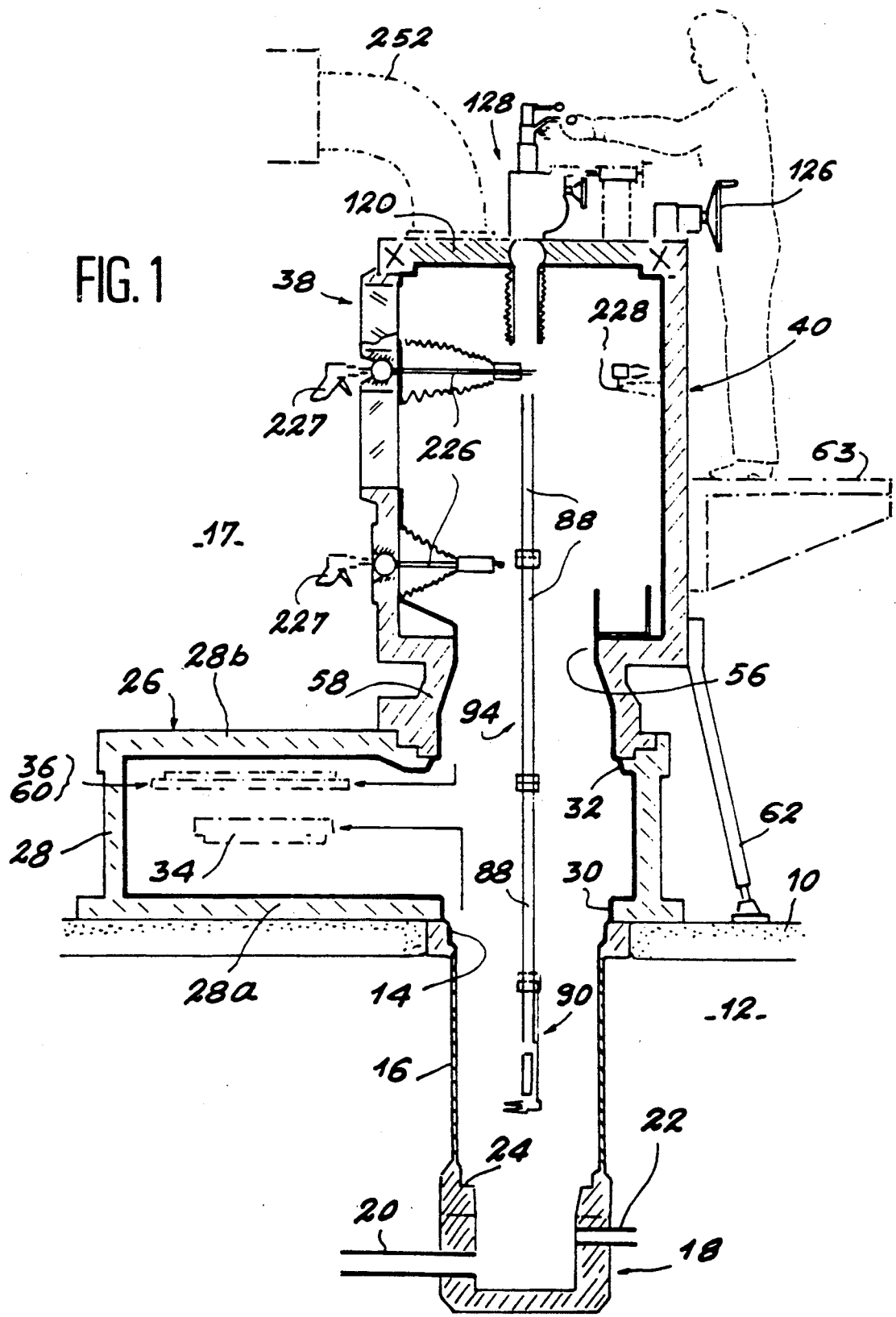
FIG. 1 is a side and cutaway view diagrammatically representing a mobile intervention chamber conforming to the invention and docked by means of an interior percussion cap lock on the upper wall of an active cell.

On FIG. 1, the reference 10 denotes the horizontal upper wall of a active cell 12 in which a nuclear installation is situated, such as an installation for the reprocessing of nuclear fuel elements previously irradiated in nuclear reactors.

At certain locations requiring periodic intervention, the wall 10 is traversed by an access orifice 14 extended inside the cell 12 by a sheath 16. Inside the sheath 16, a mobile sub-assembly (M.S.A.) is normally placed ensuring continuity of the radiological protection and confinement of the cell 12 with respect to the intervention zone 17 situated above the wall 10. This mobile sub-assembly is removed prior to the actual intervention with the aid of any type of mobile equipment removal chamber (M.E.R.C.) not forming part of the invention.

The sheath 16 allows for access to be gained to an installation 18 placed inside the cell 12. In the example shown in FIG. 1, this installation may contain a control valve used to control the flow of a liquid between two pipes 20 and 22 with the aid of a valve belonging to the mobile sub-assembly (not shown) and cooperating with a seat 24 situated between the pipes 20 and 22. The installations on which intervention may be made by means of the mobile chamber of the invention may, however, be of different types and involve, for example, agitators, ventilation filters, pumps, sectioning valves, measuring wheels, analyzers, pH/meters, conductivimeters, etc.

On FIG. 1, the reference 1 generally denotes an interior percussion cap lock brought back inside the cutting plane. This lock 26, which is currently used, shall not be described in detail.

The lock 26 is the same as the one used to serve as an interface between the MERC chamber in which the mobile sub-assembly has been previously placed, this sub-assembly normally sealing off the sheath 16, and the wall 10 of the cell 12. This lock 26 includes a confinement and radiological protection casing 28 equipped with means (not shown) making it possible to coupled it onto the wall 10 in a position so as that two access openings 30 and 32 opposite each other, respectively formed in one lower horizontal wall 28a and in one upper horizontal wall 28b of the casing 28, are aligned vertically with the access orifice 14 formed in the wall 10. These openings 30 and 32 are normally sealed off by doors 34 and 36 respectively whose opening and closing, as well as retraction inside the lock 28 for freeing the passage between the openings 30 and 32, are controlled by a mechanism comprising a carriage (not shown) placed inside the casing 28.

On FIG. 1, the reference 38 generally denotes a mobile intervention chamber conforming to the invention. This mobile intervention chamber is provided to be docked onto the upper wall 28b of the lock 28 so as to allow for access to the internal section of the installation 18 housed in the cell 12 through the openings 30 and 32 and the access orifice 14 in order to intervene on this installation 18, whilst ensuring continuity of the radiological protection and confinement of the cell 12 with respect to the intervention zone 17 situated above the wall 10.

The mobile intervention chamber 38 of the invention is now to be described in more detail with reference to FIGS. 1 to 4.

First of all, the mobile intervention chamber 38 includes a sealed parallelpiped-shaped caisson 40 mainly constituted by stainless steel walls. This caisson includes one lateral wall with a rectangular horizontal section having one vertical front face 42, one vertical rear face 44 and two vertical lateral faces 46 and 48. The sealed caisson 40 also includes one horizontal floor 52 and one horizontal ceiling 50.

Figure 2:
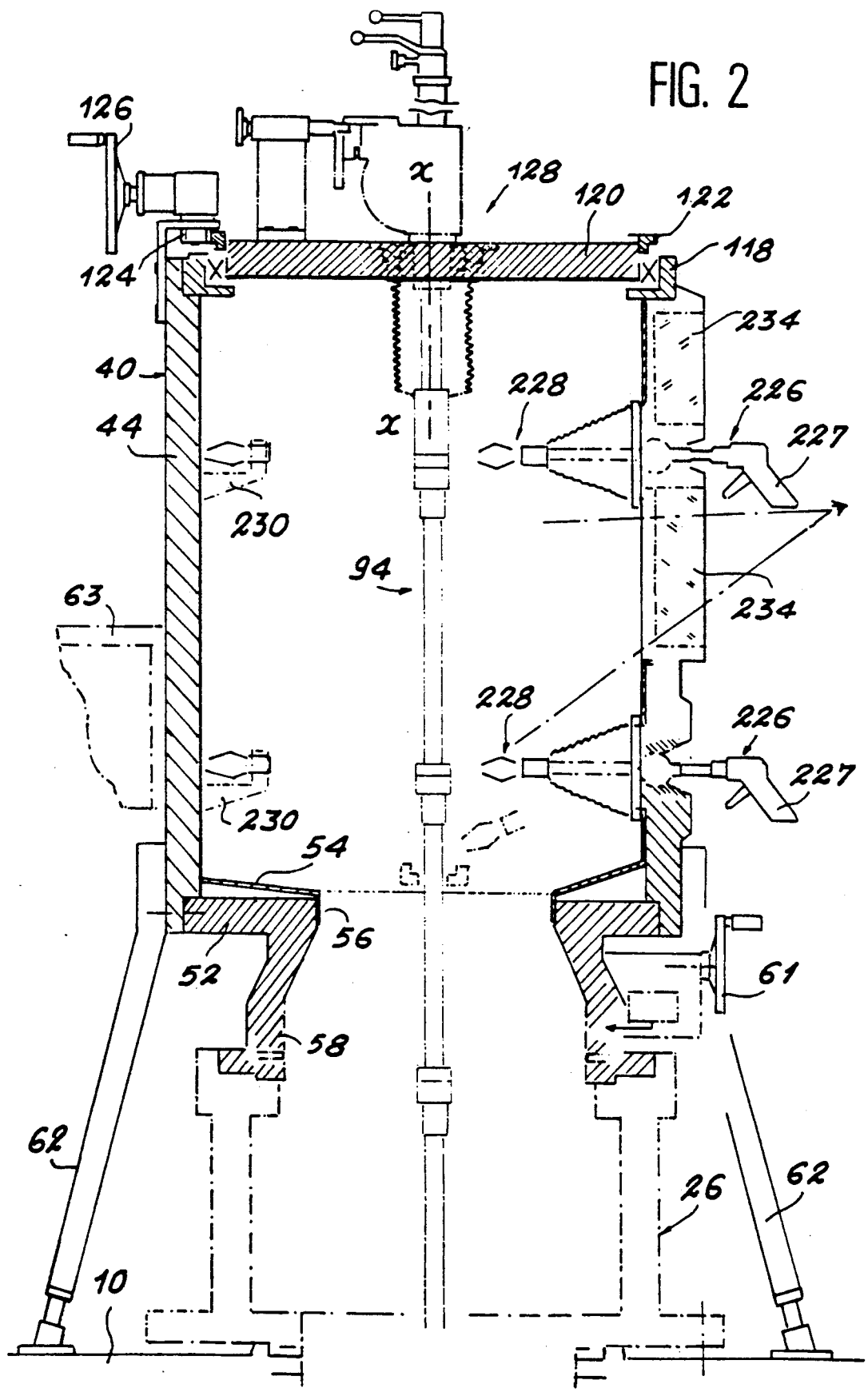
FIG. 2 is a cutaway view on larger scale of the mobile intervention chamber of FIG. 1.
Figure 3:
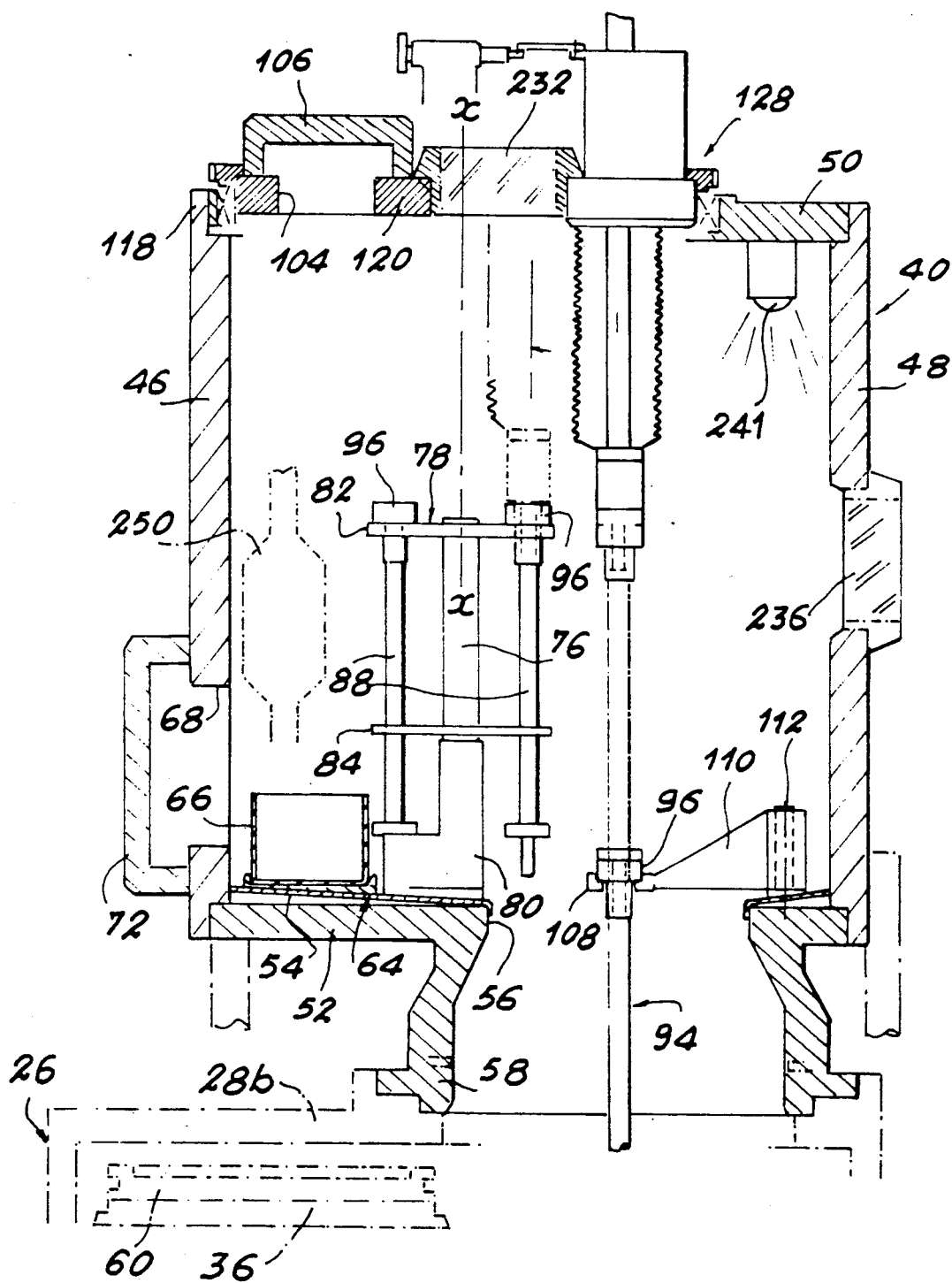
FIG. 3 is a vertical cutaway view of the mobile chamber along a plane perpendicular to the cutting plane of FIG. 2.

As shown on FIGS. 2 and 3, the floor 52 is constituted by a wall on which a diamond point-shaped bottom 54. The shape of this bottom makes it possible to firstly avoid any liquid retention and secondly to facilitate the gripping of any object to be laid on it.

At an equal distance from the front 42 and rear faces 44 and close to the lateral face 48 (see FIG. 4), the floor 52 is pierced with a circular access opening 56. This access opening 56 is extended towards the bottom by a cylindrical body 58 comprising at its lower extremity a known type of locking mechanism making it possible to secure and seal the mobile chamber 38 onto the upper face 28b of the lock 26 so that the access opening 56 is axially aligned with the passages 30 and 32 and the access orifice 14.

The lower extremity of the cylindrical body 58 is normally sealed off by a door 60 coupled with the door latter. The door 60 is normally seal-locked in the cylindrical body 58 by a locking mechanism 61 (FIG. 2) mounted on the latter. This mechanism may comprise pivoting fingers able to penetrate into a throat formed at the periphery of the door.

When the mobile intervention chamber 38 has been coupled onto the lock 26, height-adjustable and dismantable support feet 62 (FIGS. 1 and 2) are secured to the sealed caisson 40 so that the latter rests stable in a proper defined position on the upper wall 10.

A dismantable service platform 63 is also secured to at least one rear face 44 of the caison 40 so as to enable operators to gain access to the observation and control devices situated in the upper section of the mobile chamber 38. The access to this service platform is rendered easier by a stairway (not shown).

Figure 4:
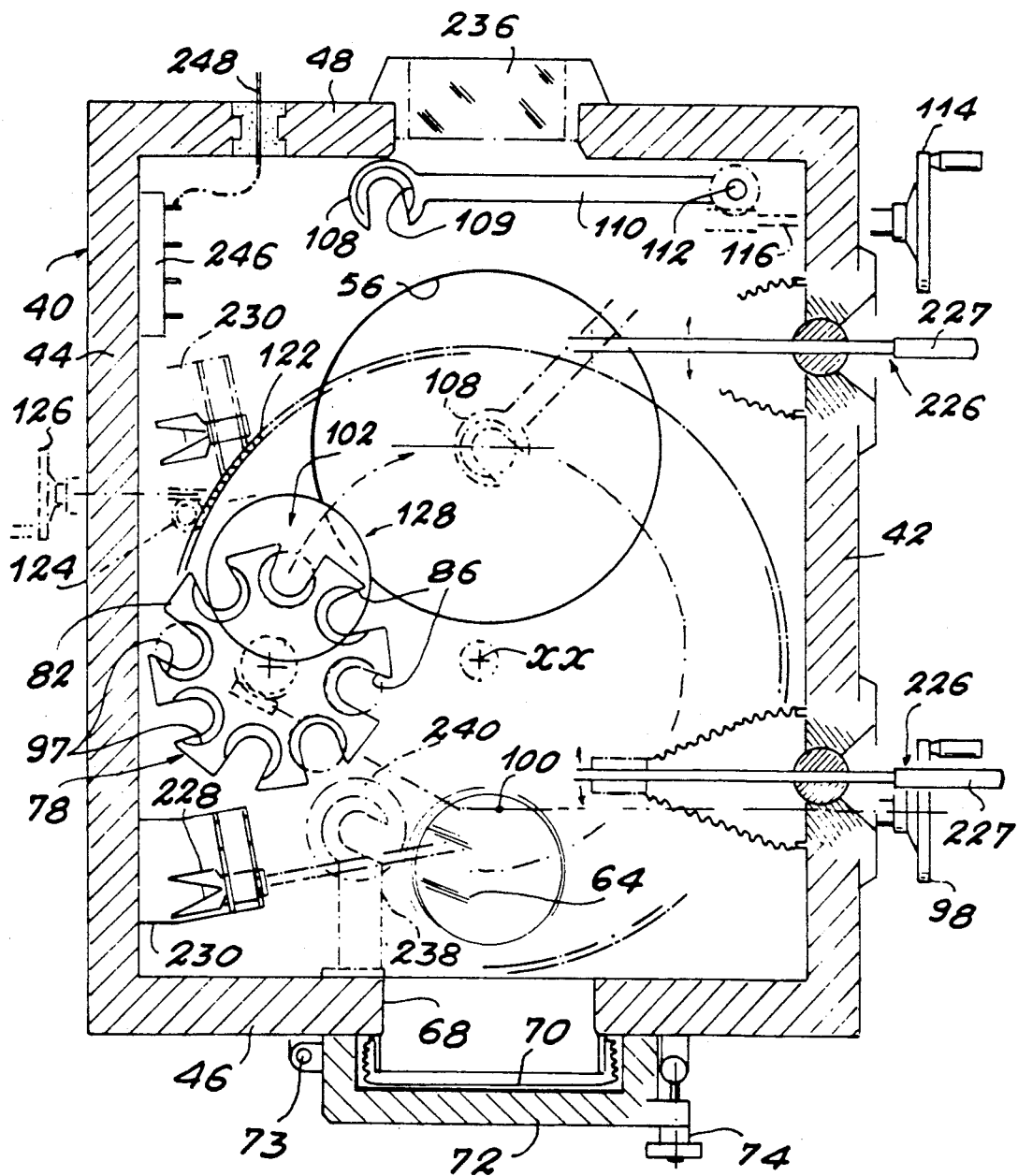
FIG. 4 is a top cutaway view diagrammatically showing the relative disposition of various devices placed inside the sealed caisson.

At one location close the lateral face 46 and situated at an equal distance from the front 42 and rear 44 faces of the sealed caisson 40, the floor comprises a receptacle 64 provided to receive a waste bin 66 (FIGS. 3 and 4). So as to enable the waste bin 66 to be introduced and removed and possibly other items of equipment, the lateral face 46 includes, in its lower section and at an equal distance form the front 42 and rear 44 faces, a circular passage 68 normally sealed off by a bag cushion 70. A door 72 joined by a hinge 73 to the outside of the lateral face 46 makes it possible to ensure continuity of radiological protection around the bar cushion 70. The closing of this door 72 is provided by a manual closing device 74.

Close the rear face 44 and on the side of the lateral face 46, the floor 52 of the sealed caisson also supports the vertical spindle 76 of a tool holder barrel 78. The spindle 76 is rotary-supported by a part 80 laid on the floor 52. The barrel 78 also comprises two horizontal disk-shaped plates 82 and 84 secured at their centers to the spindle 76. On their peripheries, the plates 82 and 84 have hollow sections 86 (FIG. 4) regularly distributed and being aligned vertically. These hollow sections 86 constitute receptacles, such as eight in the embodiment represented, in which the modular elements are able to be placed, these elements including extension pieces 88 and tools, such as the pliers 90 and a suction joining piece 82 to be subsequently described in detail with reference to FIGS. 6, 7, 8, 9 and 10 respectively.

The various modular elements 88, 90 and 92 have been designed so as to be able to be assembled end-to-end inside the sealed caisson 40 in order to form an intervention pole 94 (FIG. 1) whose characteristics are perfectly adapted to each particular task.

Each of the modular element constituted by the extension pieces 88 and by the tools 90 and 92 may be placed on any of the receptacles of the tool holder barrel 78 defined by the hollow sections 86. To this effect, each of these elements comprises at its upper extremity a flange 96 able to rest on the upper plate 82 when this element is received in one of the receptacles. More specifically, the flange 96 penetrates into a safety countersinking 97 (FIG. 4) formed on the upper face of the plate 82 around each hollow section 86.

As shown in FIG. 4, rotation of the tool holder barrel 78 may be controlled manually from the outside of the sealed caisson 40 by a flywheel 98. This flywheel makes it possible to rotary-drive the spindle 76 in either direction by means of any type of transmission mechanism diagrammatically shown at 100 on FIG. 4. It is to be noted that this mechanism for controlling rotation of the barrel also allows for an indexing of the angular position of the latter and enables each of the receptacles constituted by the hollow sections 86 to be placed in turn at a location, known as a hold station, and denoted by the reference 102.

The floor 52 of the sealed caisson 40 also bears a retractable support 108 shown on FIGS. 3 and 4. This supports is constituted by a scalloped horizontal disk so as to give it the shape of a hook. It is placed at the extremity of a rectilinear arm 110 whose opposing extremity is articulated around a vertical spindle 112 secured to the floor 54 in the angle formed by the front face 42 and by the lateral face 48.

This disposition makes it possible to move the support 108 between on retracted position, shown by the full line on FIG. 4 in which the support 108 and the arm 110 are virtually attached to the lateral face 48 and totally free the access opening 56, and one active position, shown by the dot-and-dash lines on FIG. 4 in which the support 108 is vertically aligned with the axis of the access opening 56. The scalloping formed in the disk constituting the retractable support 108 is virtually open at a right angle with respect to the arm 110 and orientated towards the access opening 56 when the support is in its retracted position. A countersinking 109 (FIG. 4) is formed around the scalloping on the upper face of the support 108 so as to receive the flange 96 from each of the modular elements.

The pivoting of the arm 110 bearing the retractable support 108 between the retracted and active positions of the latter is manually controlled from outside the sealed caisson 40 by a flywheel 114 placed on the front face 42 and connected to the arm 110 by any type of movement transmission mechanism, such as the one diagrammatically shown at 116 on FIG. 4.

As shown on FIGS. 2 and 4, the floor 50 of the sealed caisson 40 comprises a circular opening delimited by a ball ring 118 on which a rotary horizontal plate 120 is mounted closing the opening delimited by the ring 118. The vertical axis x—x of this plate is situated at ana equal distance from the front 42, rear 44 and lateral 46 faces of the caisson and its diameter is only slightly less than the distance separating the front and rear faces. In addition, this axis x—x is situated at an equal distance from the vertical axes of the access opening 56, the hold station 102 and from the receptacle 64.

So as to control rotation of the plate 120, the latter includes, outside the sealed caisson 40, an annular gear 122 on which a pinion 124 is geared (FIG. 2) whose vertical axis is supported by the rear face 44 of the caisson in the same way as a manoeuvre flywheel 126 able to control rotation of the pinion 124 by means of an angle return transmission mechanism.

The rotary plate 120 comprises a mechanism, generally denoted by the reference 128, for supporting and controlling the intervention pole 94. As shown on FIG. 4, this mechanism 128 is implanted on the rotary plate 120 at a location offset with respect to the axis of the latter so that it is able to be successively placed vertical from the hold station 102, the access opening 56 and the receptacle 64.

Figure 5:
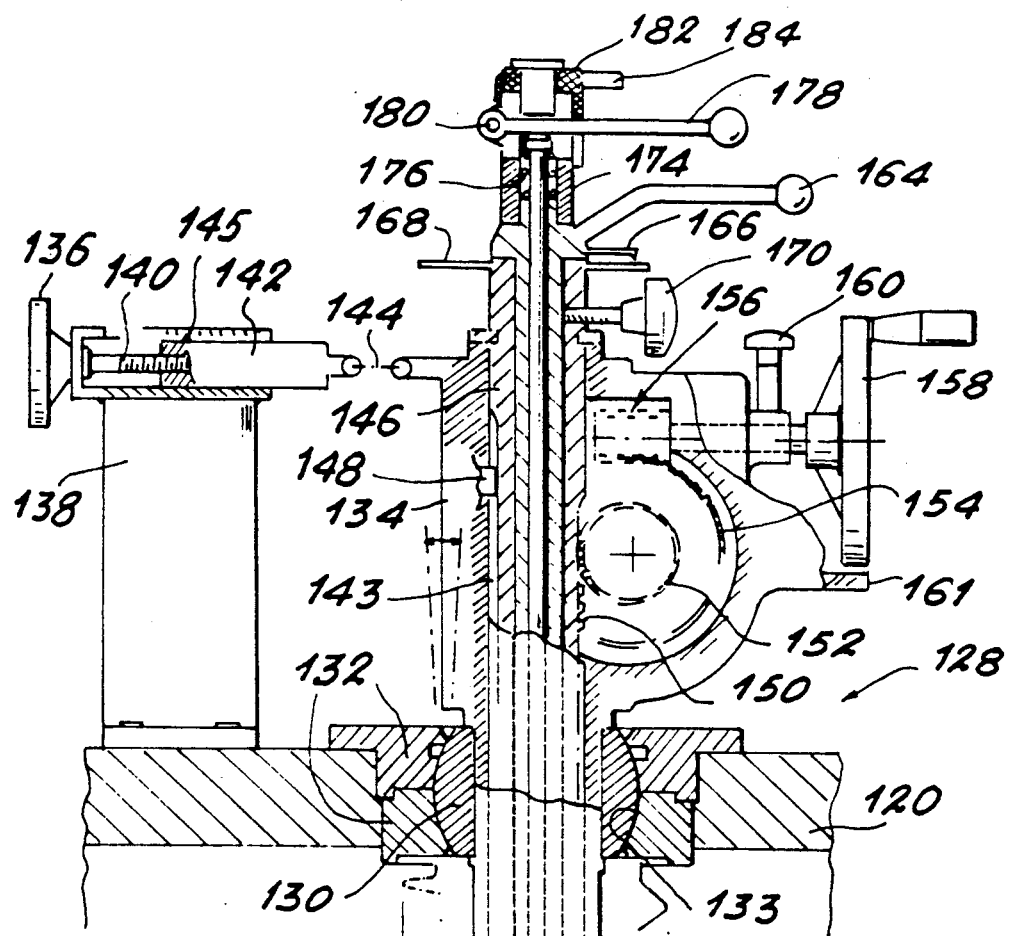
FIG. 5 is a cutaway view representing on larger scale the supporting and control mechanism of the intervention pole.

There now follows a detailed description of the support and control mechanism 128 with reference to FIG. 5.

This mechanism 128 firstly includes a pot type joint 130 seal-mounted in the rotary plate 120 between two flange 132 secured to the plate 120 and interiorally delimiting a spherical recess 133 in which the pot type joint 130 is able to rotate around its center. An oscillating tubular unit 134 is rotary-and-translation immobilized with respect to the pot type joint 130 and traverses the latter so that the axis of the unit 134 passes through the center of the pot type joint.

The axis of the oscillating tubular unit 134 may be oriented vertically or slanted from a certain angle in any direction around the center of the pot type joint 130. The angle and direction of inclination of the oscillating tubular unit 134 with respect to vertical are adjusted with the air of two inclination control mechanisms disposed 90° from each other, one of these mechanisms being shown on FIG. 5.

Each of these inclination control mechanisms includes a flywheel 136 whose horizontal axis is mounted on a support 138 secured to the upper face of the rotary plate 120. This flywheel 136 is integral with a screw 140 whose horizontal axis cuts the vertical line passing through the center of the pot type joint 130. This screw 140 is screwed into a nut rotary-immobilized in the support 138. The extremity of the nut 142 nearest the oscillating tubular unit 134 is connected to this unit by a rocker bar 144 whose extremities are rotary-joined respectively onto the nut 142 and the oscillating tubular unit 134.

A knowledge of the inclination of the oscillating tubular unit is obtained by graduations formed on the support 138 opposite a finger 145 linked to the nut 142.

The control and support mechanism further includes a sliding tubular unit 146 mounted in the oscillating tubular unit 134 so as to be able to slide inside the latter whilst being rotary-immobilized, for example with the aid of a key 148 fixed in the unit 134 and received in a key grove 143 formed on the tubular sliding unit 146.

Control of movement of the sliding unit 146 inside the oscillating tubular unit 134 is effected with the aid of a rack 150 formed on the sliding tubular unit 146 and on which a pinion 152 is geared whose axis orthogonal to the axis of the mechanism 128 is supported by the oscillating tubular unit 134. The axis of the pinion 152 is also integral with a pinion 154 on which an endless screw 156 is geared whose axis, also supported by the oscillating tubular unit 134, bears at its opposing extremity a manoeuvre flywheel 158. A handle 160, integral with a screw rod screwed into a spring-action nut (not shown) housed in the unit 134, makes it possible to block the mechanism for controlling movement of the sliding unit 146 by applying said spring-action nut against the spindle connecting the endless screw 156 to the flywheel 158.

The position occupied by the sliding unit 146 inside the oscillating unit 134 is marked by an index borne by the flywheel 138 opposite a graduation formed on the projecting part 161 of the unit 134 partly surrounding the flywheel 158.

In order to fully understand the invention, it is to be noted that the sliding unit 146 is shown in its bottom position at the upper part of FIG. 5, whereas this unit is shown respectively in its top position and bottom position on the left and right halves of the bottom part of FIG. 5.

Inside the sliding tubular unit 146, a rotary tubular unit 162 is mounted translation-immobilized in the unit 146 whilst being able to rotate freely inside the latter. At its upper extremity projecting beyond the upper extremity of the unit 146, the rotary tubular unit 162 bears a manoeuvre handle 164. The angular position of the rotary unit 162 with respect to the sliding unit 146 may be marked by means of a finger 166 fixed to the rotary unit 162 immediately below the manoeuvre handle 164, this finger being situated opposite a graduation formed on a horizontal plate 168 fixed to the upper extremity of the sliding unit 146.

By screwing or unscrewing a blocking handle 170 traversing the unit 146, it is possible to deliberately authorize rotation of the unit 162 or, on the other hand, prevent its rotation.

Inside the rotary tubular unit 162, a cylindrical rod 172 is sliding-mounted, this rod making it possible to control, as shall be seen subsequently, the opening and closing of a pair of pliers, such as the pliers 90 of FIG. 9, when these pliers are mounted at the lower extremity of the intervention pole 94.

The upper extremity of the cylindrical rod 172 projects inside a support tubular unit 162. A control lever 178 is joined onto the support piece 174 by a spindle 180 orthogonal and offset with respect to the axis of the mechanism 128 common to the rod 172 and the units 134, 146 and 162. This lever 178 traverses the support piece 174 by two diametrically opposing apertures formed on the latter. The upper extremity of the rod 172 is kept in support against the lever 178 by a helical compression spring 176 surrounding the rod 172 and whose opposing extremities respectively take support against the upper face of the rotary tubular unit 162 and against a shoulder formed on the rod 172. By reaction, the lever 178 is moved upwards against a cam surface formed on a cowl 182 rotary-mounted at the upper extremity of the piece 174. This cowl 182 comprises a handle 184 able to control its rotation between one unblocking position shown on FIG. 5 in which the lever 178 occupies at rest a roughly horizontal position corresponding to the closing of the pliers whilst being able to pivot freely downwards so as to control opening of the pliers, and a blocking position in which the lever 178 is locked in the bottom opening position of the pliers.

Inside the sealed caisson, sealing bellows 186 are secured respectively to the lower flange 132 and to the lower extremity of the sliding unit 146. In addition, imperviousness between the sliding tubular unit 146 and the rotary tubular unit 162 is provided by joints 188.

At its lower extremity, the rotary tubular unit 162 bears a support 190 on which any one of the modular elements, constituted by the extension pieces 88 and the tools 90 and 92, are able to be secured. A rocker bar 192 is joined by one of its extremities onto the support 190 around a hinge pin 193 orthogonal and offset with respect to the axis common to the rod 172 and the rotary unit 162. The rocker bar 192 is also joined at its central section to the extremity of the cylindrical rod 172 by a hinge pin 195 parallel to the hinge pin 193. Finally, the opposing extremity of the rocker bar 192 is jointed to the upper extremity of a rod 194 with an axis parallel to the axis of the rod 172 by a hinge pin 197 parallel to the hinge pins 193 and 195.

The rod 194 is mounted sliding ion the support 190 and normally kept in a high position shown on FIG. 5 by a compression spring 196. This high position corresponds to the abutting of a section with a larger diameter formed at the lower extremity of the rod 194 against a shoulder formed in the support 190. In these conditions, the lower face of the rod 194 trims flush the lower plane face 198 of the support 190.

The support 190 extends downwards beyond the plane face 198 in the form of a tubular end piece 200 able to be stored in a complementary recess 202 open towards the top formed in the upper section of each of the modular elements constituted by the extension pieces 88 and the tools, such as 90 and 92. As shown on FIG. 6, it is to be noted that each of the extension pieces 88 comprises at its lower extremity a tubular joining piece similar to the tube 200 and enabling any number of extension pieces to be stored end-to-end.

As shown on FIGS. 6 and 7, each of the modular elements 88, 90 and 92 comprises close to its upper extremity a locking device constituted by a cylindrical key 204 rotary mounted in a flange 96 around an axis orthogonal and offset with respect to the axis of the corresponding modular element. More specifically, this axis is disposed on a roughly tangential position with respect to the recess 202 formed in the upper section of the modular element. Outside the flange 96, the key 204 is integral with a control lever 206 able to control its rotation. In its central section, the key 204 comprises a flat piece 208 giving it as a section the shape of a half-circle (FIG. 6).

having regard to the location occupied by the key 204, the tubular joining piece 200 is able to freely penetrate inside the complementary recess 202 when the flat piece 208 is orientated towards this recess (unlocking position). On the other hand, this introduction is impossible when the flat piece is orientated in the opposite direction (locking position), as shown on FIGS. 6 and 7.

At one location situated close the key 204, the tubular element 200, when introduced into the recess 202, has a groove 210 with a semi-circular section. Accordingly, after introducing the centering tube 200, the rotation of the key 204 in its locking position enables the link to be locked between the support 190 and one of the extension pieces 88 or the link between any two of the modular elements.

As shown on FIGS. 6, 8a and 8b, blocking means are associated with each of the locking means constituted by the keys 204 so as to ensure that the latter are not accidentally unlocked on account of a handling error when they are providing the link between several modular units of the intervention pole 94.

These blocking means include two safety bolts 212 housed in the slots made in each flange 96 so as to be able to slide parallel to the axis of the modular element between one upper unblocking position (FIG. 8b), in which the lower extremity of each of the bolts 212 trims flush the lower face 214 of the flange 96, and a lower blocking position (FIGS. 6 and 8a) in which the lower extremity of each of the bolts 212 projects beyond the face 214.

As shown clearly on FIGS. 8a and 8b, each of the bolts 212 comprises a window 216 traversed by the key 204 and whose height delimits the clearance of the bolt between these top and bottom positions. Over most of its height, the window 216 is slightly wider than the diameter of the key 206. However, the upper extremity of the window 216 comprises one section 218 with a reduced width slightly larger than the radius of the key 204, this section being situated on the side of the recess 202 formed in the upper section of the modular element with respect to the vertical axis of the window 216.

Moreover, it is to be noted that the tubular joining piece 200 formed at the lower extremity of each of the modular elements comprises longitudinal grooves (not shown) into which the bolts 2112 automatically penetrate when the joining piece is nested in the recess 202. To this effect, a rotary indexing between the modular elements it is desired to couple is obtained with the aid of a finger 220 which projects onto the upper face of each of the flanges 96 so as to be able to penetrate into a notch 222 opposite it formed in the lower section of the support 190 and from each of the modular elements. This rotary indexing further makes it possible to render rotary-integral each of the adjacent modular elements of the intervention pole.

As shown on FIGS. 8a and 8b, each of the bolts 212 is stressed towards its bottom locking position by a helical compression spring 224 inserted between the upper face of the bolt and the top extremity of the slot in which the latter is received inside the flange 96.

By means of this disposition, when the modular elements constituted by the extension pieces 88 and the tools 90 and 92 are laid on the tool holder barrel 78, the lower face 214 of the flange 96 rests on the upper face of the plate 82 of the barrel so that the bolts 212 are automatically pushed back into their top position shown on FIG. 8b. In this position, the key 204 is found in the wide section of the window 216 so that the control handle 206 is able to rotated freely so as to place the key in its locking or unlocking position.

On the other hand, when the module elements are not placed on the tool holder barrel 78, each of the springs 224 stresses the bolts 212 towards the bottom. Accordingly, as soon as the control lever 206 is turned so as to bring the key 204 into its locking position the portion with a semi-cylindrical section of the key delimited by the flat piece 208 penetrates into the upper section 218 with a reduced width of the window 216, as shown on FIG. 8a. In these conditions, the flat piece 208 is found in direct contact with one edge of the reduced width section 218 of the window 216 so that any rotation of the key 204 becomes impossible. Any accidental unlocking is thus prevented.

After being able to activate the control handle 206 inside the sealed caisson 40, the mobile intervention chamber of the invention also comprises accompanying handling means constituted by auxiliary handling arms 226, such as four, implanted on two levels in the front face 42 of the sealed caisson 40. In the embodiment example shown on FIGS. 2 and 4, these auxiliary handling arms 226 are rigid arms which rotating and sliding traverse the front face 42, these arms being controlled from outside the caisson by a gun equipped with a pliers control stable. The extremities of these auxiliary handling arms situated inside the sealed caisson 40 are equipped with interchangeable gripping pliers 228 which may be deposited and replaced by means of racks 230 implanted on the rear face 44 of the caisson.

So that the operator is able to carry out the desired handlings inside the sealed caisson 40, especially with the aid of the intervention pole 94 and the auxiliary handling arms 226, vision shielding windows 232 and 234 are respectively mounted on the rotating plate 120 and on the front face 42 of the caisson. So as to improve vision, other shielding windows may also may implanted in the walls of the caisson 40, such as a shielding window 236 mounted on the lateral face 48, as shown on FIGS. 3 and 4.

So as to enable tools not initially provided to be introduced into the caisson 40, an access orifice 104 shown on FIG. 3 is provided in the rotating plate 120 at a location moved out of center with respect to its axis x—x. Like the access orifice 68, this orifice 104 is normally blocked off by a bag cushion (not shown) around which outside the sealed caisson 40 a door 106 is placed ensuring continuity of radiological protection. This orifice 104 may be brought to vertical from a housing of the tool holder barrel 78 by rotating the rotary plate 120.

The mobile intervention chamber of the invention may also include certain tools suitable for being adapted on the intervention pole 94, but whose spatial requirement is too large to enable them to be stored on the tool holder barrel 78. In this case and as solely represented on FIG. 4 so as to avoid encumbering the other figures, one or several tool holder racks 238, ended by a scalloped disk forming a hook situated at the same level as the upper plate 82 of the barrel 78, are placed inside the caisson 40 and supported, for example, by the lateral face 46. The hook-shaped scalloped disk of the rack 238 is placed in the same way as the hold station 102, the receptacle 64 and the access opening 56 at a location provided so as to be aligned with the vertical line passing through the center of the pot type joint 130 of the mechanism 128 supporting the intervention pole 94 under the effect of a suitable rotation of the rotary plate 120.

The tool holder rack 238 may support a suction module 240 whose upper extremity is equipped with a flange 96 in the same way as each of the tools and extension pieces constituting the modular elements able to be placed end-to-end so as to form the intervention pole 94. This suction module 240, provided to be mounted directly onto the support 190 of the mechanism, is provided with a suction turbine and a filter (not shown).

So as to improve visibility, one or several projectors 241 (FIG. 3) are preferably mounted so as to be adjustable inside the sealed caisson 40, such as on the ceiling 50. Lighting may be completed by the use of an inspection lamp (not shown) able to be lowered into the sheath 16 giving access to the installation 18.

So as to ensure that the operations carried out inside the sheath 16 are visible, video cameras 242 may be secured to each of the tools, such as the tools 90 and 92 shown on FIGS. 9 and 10. These video cameras 242 are equipped with hooking rings 244 enabling them to be suspended from a support 246 mounted, for example, on the rear face 44 of the sealed caisson, as shown on FIG. 4. Each of the cameras 242 is also equipped with a fixing system enabling it to be mounted on each of the tools, such as 90 and 92, by using one of the auxiliary handling arms This fixing system may be a key system similar to the one used to interconnect each of the modular elements to the intervention pole.

The cable 248 connecting each of the video cameras to the video equipment (now shown) situated outside the caisson 40 seal-traverses the wall of the latter, such as the lateral face 48 as shown on FIG. 4, at the same time a flexible pipe allowing the high pressure cleaning tool to be fed with water.

The mobile intervention chamber of the invention is also equipped with a ventilation circuit and a circuit for depressurizing the internal volume of the sealed caisson 40. This circuit, which is not shown in full on the figures, makes it possible to suck up the air contained inside the caisson through a filter 250 diagrammatically shown on FIG. 3. The ventilation pipe 252 (FIG. 1) then traverses the ceiling 50 of the caisson so as to be connected to a pump (not shown) situated outside the latter or to the ventilation circuit of the interior percussion cap lock. Thus, the atmosphere contained in the caisson 40 is depressurized and filtered. It is to be noted that the filter is interchangeable and may be placed in the waste bin 66 with the aid of one of the handling arms 226 so as to be removed outside the sealed caisson.

The various tools able to equip the intervention pole 94 include one or several intervention pliers, such as those of FIG. 9, a suction module, such as the module 240, placed on the receptacle 238, one or several suction extension pieces, such as the one shown on FIG. 10, and a pumping module (not shown).

As shown on FIG. 9, the intervention pliers 90 comprise at their upper extremity, like all the other modular elements, a flange 96. This flange 96 is extended towards the bottom by an elongated body 254 bearing at its lower extremity a fixed gripping jaw 256. This gripping jaw 256 is orientated approximately at a right angle with respect to the elongated body 254. A mobile gripping jaw 258 is joined onto the latter immediately above the fixed gripping jaw 256 by means of a hinge pin 260 orientated along a direction perpendicular to the axis of the elongated body 254, as well as perpendicular to the direction defined by the gripping jaws 256 and 258.

The intervention pliers 90 further include a rectilinear cylindrical rod 262 which extends over the entire length of the elongated body 254 and parallel to the latter on the side opposite the gripping jaws 256 and 258. The upper extremity of the rod 262 is received sliding into a perforation traversing the flange 96 and in which a helical compression spring 264 is also housed surrounding the rod 262 and placed between a shoulder formed on the latter and a shoulder formed inside the perforation of the flange 96 so as to exert on the rod 262 a force tending to move it towards the top.

The rod 262 is also guided near its lower extremity by a perforation formed inside a protuberance 266 of the elongated body 254. Below this protuberance, the rod 262 comprises at its lower extremity a disk-shaped portion 268 which is housed in a notch formed in the mobile gripping jaw 258 at a location opposite the active portion of the latter with respect to its hinge pin 260.

By means of the disposition described above, the spring 264 normally stresses the rod 262 in a top position corresponding to the mobile gripping jaw 258 abutting against the fixed gripping jaw 256, that is on closing of the pliers. In these conditions, the upper extremity of the rod 262 trims flush the upper face of the flange 96. So as to control opening of the pliers, it merely suffices to exert on the upper extremity of the rod 262 a force orientated towards the bottom and tending to compress the spring 264.

If it is assumed that the intervention pliers 90 are directly secured to the support 190 shown on FIG. 5, the rod 262 is found in the prolongation of the rod 194 sliding in this support. As a result, the opening of the pliers may be controlled by ensuring a movement towards the bottom of the rod 194 against the spring 196. Such a movement may be obtained by making the control lever pivot towards the bottom around its hinge pin 180.

If, as is normally the case, one or several extension pieces 88 are placed between the support 190 and the intervention pliers 90, the downward movement of the rod 194 is transmitted to the rod 262 by a sliding rod 270 mounted on each of the modules 88 parallel to the latter and over its entire length (FIG. 6). Each of the rods 270 is normally kept by a helical compression spring 272 in a top position in which the extremities of this rod 270 trim flush the upper and lower faces of the extension piece 88.

As shown on FIG. 9, one of the video cameras 242 may be received on the side of the elongated body 254 opposite the rod 262. The camera 242 is locked on the elongated body 254 by a locking mechanism 271 and kept in place at its lower extremity by a flexible nesting piece 272 with a C-shaped section.

FIG. 10 shows a suction extension piece 92 which also comprises a flange 96 at its upper extremity. This extension piece further includes a tube 274 ended at its lower extremity by an incurved elongated joining piece 276.

The suction extension piece 92 is designed so as to be placed at the extremity of a series of extension pieces 88 when the suction tool 240 is directly connected on the support 190. As with the other tools, the number of extension pieces depends on the desired level of intervention. As shown diagrammatically on FIG. 6, so that suction up may be made through the extension pieces 88, each of the latter is traversed over its entire length by a passage 278.

Like the other tools, such as the intervention pliers 90, the suction extension piece 92 is provided so as to support a video camera 242 by means of a locking mechanism 279 and a support with a flexible C-shaped section.

The intervention made on the installation 18 inside the cell 12 shall now be described briefly with reference to the figures.

Initially, the interior percussion cap lock 26 is placed so as to allow for dismantling of the mobile subassembly normally blocking off the sheath 16. As has already been mentioned, this dismantling is effected with the aid of a mobile equipment removal chamber of any known type not forming part of the invention.

The mobile intervention chamber 38 of the invention is then docked onto the interior percussion cap lock 26 with the aid of suitable locking means (not shown). The doors 34 and 36 of the interior precussion cap lock 26 and the door 60 closing the mobile intervention chamber at its lower extremity are then retracted inside the lock with the aid of the conventional mechanism equipping the latter.

The operators then form the intervention pole 94 by using the various modular elements available inside the sealed caisson 40, whilst taking account of both the depth at which intervention needs to be made and the nature of this intervention. As regards the pole assembly procedure, it is to be noted that this is constituted by starting via the bottom, that is normally the tool which may be pliers, a suction extension piece or a pumping tool, and then by progressively lifting above this tool as many extension pieces as are required.

During this procedure, the operator firstly places the mechanism 128 in a position so that the various tubular units 134, 146, and 162 and the rod 172 are disposed vertically. This operation is effected manually by acting on the flywheels 136 by means of information supplied by marks provided to this effect. The operator than rotates the tool holder barrel 78 by manually acting on the flywheel 98 so as to give the hold station the desired modular element. The retractable support 108 is then placed in its retractable position shown by the full line on FIG. 4 by possible acting on the flywheel 114, if this is not already in this position.

Once these preparatory operations have been completed, the operator pivots the rotary plate so as to bring the axis of the mechanism 128 to vertical from the hold station 102. With the aid of one of the handling arms 226, the operator activates the control lever 206 of the subassembly situated on the tool holder barrel 78 at the hold station 102 so as to bring the key 204 into its unlocking position. By acting on the flywheel 158, the operator then lowers the tubular unit 146 in which the rotary tubular unit 162 and the central rod 172 are placed so as to make the tubular joining piece 200 of the support 190 penetrate into the housing 202 of the corresponding modular element. This lowering is continued until these two pieces come into contact with each other. The operator reactivates the control lever 206 with the aid of one of the accompanying pliers 226 so as to bring the key 204 to its locked position.

When the corresponding modular element has been locked onto the support 190 as described above, the operator activates the flywheel 158 in an opposite direction so as to lift the unit to a sufficient height so as to free the flange 96 of the modular element of the safety countersinking 97 formed in the upper plate 82 of the tool holder barrel 78. Then the rotary plate 120 is made to pivot clockwise as shown on FIG. 4, which has the effect of completely freeing the modular element picked up by the mechanism 128 of the tool holder barrel 78 and bring this modular element within the axis of the sheath 16.

The assembly constituted in this way is then lowered through the interior percussion cap lock 26 until most of the modular element picked up as above, except for its upper flange 96, arrives at a level situated below the level of the retractable support 108. The operator then manually makes the support pivot by activating the flywheel 114 so as to bring it within the axis of the sheath 16 and in contact with the section of the body of the modular element situated immediately below the flange 96. Lowering of the assembly is continued by acting on the flywheel 158 until the flange 96 rest on the retractable support 108.

The operator then unlocks the modulated element resting on the retractable support 108 of the support 190 with the aid of one of the gripping arms 226 by acting on the control lever 206, as described earlier. The sliding unit 146 bearing the support 190 is then brought back up so as to enable the tool holder barrel 78 to grasp another modular element, such as an extension piece 88.

When this modular element has been picked up similarly to the one described earlier for the first element and then brought within the axis of the sheath 16, the unit thus constituted is lowered so as to nest the tubular joining piece 200 of the extension piece 88 in the recess 202 of the previously seized modular element and which then rests on the retractable support 108. The two elements are then locked by activating the corresponding control lever 206 with the aid of accompanying pliers 226.

The unit thus formed is slightly lifted up by acting on the flywheel 158 so as to free the flange 96 of the modular element which was previously on the retractable support 108 of the countersinking 109 provided on the latter. The retractable support 108 may then be brought back to its retracted position shown by the full line on FIG. 4.

If a new modular element, such as an extension piece 88, needs to be added to the intervention pole 94, the unit suspended from the support 190 is lowered with the aid of the flywheel 158 so as to bring the modular element hooked to the support 190 to a level so that its flange 96 is situated a level slightly higher than that of the retractable support 108. The support 108 is then brought back within the axis of the sheath 16, as shown by the dot-and-dash lines on FIG. 4, and the preassembled elements of the intervention pole are laid on this retractable support and then unlocked from the support 190 by acting on the corresponding control lever 206 with the aid of one of the auxiliary handling arms 226 so as to enable the mechanism 128 to look for another module.

When the intervention pole needs to include a tool, such as the suction module 240 mounted on the accompanying tool holder 238, the taking of this tool by the mechanism 128 is provided in the same way as for all the other modular units by bringing the mechanism 128 vertically from the tool holder 238 instead of bringing it vertically from the hold station 102.

In addition, when assembling the intervention pliers, the modular elements, such as the pliers 90 or the suction extension piece 92, needing to carry an observation camera 242 are equipped with this camera with the aid of the handling arms 26 when the corresponding modular element is suspended from the support 190 of the mechanism 128. The arms 226 in fact enable the cameras to be seized from the rack 246, the cable linked to the camera also being coiled onto this rack and uncoiled with the aid of arms 226 as the tool is gradually lowered.

In the case of using a pumping tool constituted by a hydroejector fed by water under pressure, the flexible cable used to feed the tool with water is uncoiled at the same time as the cable of the camera equipping it.

When the intervention pole has been completely constituted, the operator carries out the desired operations being assisted by images provided by the cameras. In order to do this, he takes action upon receiving the various manual commands of the mechanism 128 so as to provide the pole with the exact desired position and, if appropriate, order the opening and closing of the pliers.

During these operations, any waste picked up by the gripping tool may be placed in the waste bin 66 after the pole 94 has been lifted up by acting on the flywheel 128 by simply rotating the rotary plate 120, it being given the fact that the receptacle 64 on which the waste bin is placed is also situated on the path passed through by the mechanism 128 when the rotary plate 120 is rotated. It is to be noted that the intervention pole 94 may also be equipped with a lockable hook gripping tool designed specially to pick up the waste bin 66. The pole is then used to bring the waste bin through the interior percussion cap lock 26 and place it in the zone to be cleaned.

Of course, the invention is not merely limited to the embodiment described above by way of example, but covers all its variants. In particular, the shape of the sealed caisson 40 may differ from the shape described, the same applying as regards the implantation of the various elements inside the caisson. In addition, the nature of the accompanying handling means constituted in the example by the arms 226 may be different and this may possibly involve more complex remote handlers. Moreover, for certain types of intervention, the waste bin 66 and the accompanying tool holder 238 may be suppressed. The number and implantation of the shielding windows and the access orifices may also differ. Finally, it can be readily understood that the number and nature of the tools used are not limited by the aforesaid descriptions.

What is claimed is:

1. A mobile intervention chamber able to be docked on an access orifice formed in an upper wall of an installation so as to intervene on said installation, this chamber including:
    a sealed caisson provided with a lateral wall; a floor pierced with a circular access opening normally blocked off by a door; and a ceiling comprising a rotary plate with an axis parallel and offset with respect to the axis of the access opening;
    a tool holder barrel housed in the caisson and able to rotate around an axis parallel and offset with respect to the axes of the rotary plate and the access opening, this barrel comprising receptacles at its periphery;
    modular elements including at least one extension piece and at least one tool able to be individually received in said receptacles and be assembled end-to-end so as to form an intervention pole;
    a retractable support housed in the caisson and able to occupy one retracted position fully freed from the access opening and one active position situated along the axis of the latter so as to be able to temporarily support the modular elements;
    a mechanism for supporting and controlling the intervention pole and implanted on the rotary plate at a suitable location in order to be placed at will along the axis of the access opening and along an axis of a hold station on which each receptacle of the barrel is able to be brought under the effect of a rotation of the rotary plate, this mechanism enabling the pole to carry out translation movements along its axis, for rotating around its axis, for pivoting around said location and activating the tool, and
    means to control from outside the caisson rotations of the rotary plate, the tool holder barrel and the retractable support.

2. The chamber according to claim 1, wherein each modular element includes a locking device able to occupy one locked position for linking with a neighbouring modular element and one mounting and dismounting position, accompanying handling means controlled from outside the caisson and being placed in the latter so as to switch the locking means between their locked and unlocked positions.

3. The chamber according to claim 2, wherein each locking device is neutralized by blocking means when the corresponding modular element is suspended in said receptacles, this blocking means freeing the corresponding locking device when the modular element is placed in position.

4. The chamber according to claim 2 or 3, wherein the accompanying handling means include at least one auxiliary handling arm traversing the lateral wall of the caisson and at least one accompanying gripping tool mounted on this arm and able to be placed on a gripping tool holder rack placed in the caisson.

5. The chamber according to claim 1, wherein the mobile intervention chamber further includes on the floor of said caisson a receptacle for a waste bin and able to be aligned with the intervention pole when rotating the rotary plate.

6. The chamber according to claim 5, wherein the lateral wall comprises a passage for introducing and removing the waste bin normally closed by a door close the receptacle of the waste bin.

7. The chamber according to claim 1, wherein the lateral wall of the caisson supports at least one tool holder rack able to be aligned vertically with the intervention pole when rotating the rotary plate.

8. The chamber according to any one of the preceding claims, wherein the mobile intervention chamber includes as least one tool selected from the group including an intervention gripping tool, a suction tool, and a suction extension piece.

9. The chamber according to claim 8, wherein long-distance observation means are provided so as to be secured to and dismantled from the tools.

10. The chamber according to claim 1, wherein the rotary plate comprises a passage for introducing and removing the modular elements, this passage normally being closed by a door, and able to be aligned vertically with at least one housing of the tool holder barrel when rotating the rotary plate.

11. The chamber according to claim 1, wherein the sealed caisson comprises ventilation means, shielding windows and internal lighting means.

* * * * *

UNITED STATES PATENT AND TRADEMARK OFFICE
CERTIFICATE OF CORRECTION

PATENT NO.  : 5,141,378

DATED       : August 25, 1992

INVENTOR(S) : Eric Lestournel, et al.

It is certified that error appears in the above-identified patent and that said Letters Patent is hereby corrected as shown below:

On the Title page, item[75], "Querqueville;" should be --Equeurdreville;--.

Column 1, line 18, "place" should be --placed--.

Column 1, line 29, "observed" should be --observe--.

Column 2, line 10, after "type" insert --,--.

Column 3, line 25, "a" (first occurrence) should be --an--.

Column 3, line 62, "coupled" should be --couple--.

Column 3, line 63, delete "as".

Column 4, line 44, after "door" (second occurrence), insert "of the lock 26 so as to be retracted inside the".

Column 4, line 68, "form" should be --from--.

Column 5, line 4, "bar" should be --bag--.

Column 5, line 7, after "Close" insert --to--.

Column 5, line 27, "element" should be --elements--.

Column 5, line 51, "supports" should be --support--.

Column 5, line 58, "on" should be --one--.

Column 6, line 15, "ana" should be --an--.

Column 6, line 42, "flange" should be --flanges--.

Column 6, line 54, "air" should be --aid--.

Column 7, line 60, after "support" insert --piece 174 fixed at the upper extremity of the rotary--.

Column 8, line 29, "jointed" should be --joined--.

Column 8, line 33, "ion" should be --in--.

Column 8, line 64, "having" should be --Having--.

UNITED STATES PATENT AND TRADEMARK OFFICE
CERTIFICATE OF CORRECTION

PATENT NO. : 5,141,378

DATED : August 25, 1992

INVENTOR(S) : Eric Lestournel, et al.

It is certified that error appears in the above-identified patent and that said Letters Patent is hereby corrected as shown below:

Column 9, line 40, "2112" should be --212--.

Column 9, line 66, "module" should be --modular--.

Column 10, line 21, "stable" should be --staple--.

Column 10, line 2, after "position" insert --,--.

Column 11, line 25, "now" should be --not--.

Column 12, line 57, "on" should be --onto--.

Column 14, line 11, "rest" should be --rests--.

Column 14, line 13, "modulated" should be --modular--.

Column 16, line 44, after "close" insert --to--.

Signed and Sealed this

Twenty-eighth Day of September, 1993

Attest:

BRUCE LEHMAN

*Attesting Officer*        *Commissioner of Patents and Trademarks*